US00RE37362B1

(19) United States
(12) Reissued Patent
D'Andrea

(10) Patent Number: US RE37,362 E
(45) Date of Reissued Patent: Sep. 11, 2001

(54) BOOK INCLUDING EDIBLE ARTICLES SUCH AS CANDY AS A PART OF THE PAGES

(76) Inventor: Deborah D'Andrea, Picture Me Books, 655 W. Market St., Akron, OH (US) 44303

( * ) Notice: This patent issued on a continued prosecution application filed under 37 CFR 1.53(d), and is subject to the twenty year patent term provisions of 35 U.S.C. 154(a)(2).

(21) Appl. No.: 09/177,093

(22) Filed: Oct. 22, 1998

Related U.S. Patent Documents

Reissue of:
(64) Patent No.: 5,573,438
Issued: Nov. 12, 1996
Appl. No.: 08/428,686
Filed: Apr. 25, 1995

(51) Int. Cl.[7] ..... A63H 33/38; A63H 3/00; A63H 3/36

(52) U.S. Cl. ..... 446/149; 446/73; 446/386; 434/429; 426/104

(58) Field of Search ..... 426/104, 132, 426/135; 446/71, 73, 147, 149, 151, 386, 385, 72–74; 40/124.06, 124.01, 124.09, 124.19, 124.191; 206/472, 460, 457; 281/511, 38; 283/117

(56) References Cited

U.S. PATENT DOCUMENTS

| | | | | |
|---|---|---|---|---|
| 1,033,576 | * | 7/1912 | Garman | 446/149 |
| 1,595,449 | * | 8/1926 | Carrm | 211/1.53 |
| 1,633,444 | * | 6/1927 | Fruitema . | |
| 2,147,134 | * | 2/1939 | Addis et al. | 426/104 |
| 2,147,135 | * | 2/1939 | Addis et al. | 426/104 |
| 2,775,523 | * | 12/1956 | Green | 446/386 |
| 2,946,137 | * | 7/1960 | Worth et al. | 446/147 |
| 3,256,634 | * | 6/1966 | Mace | 446/147 |
| 3,715,816 | * | 2/1973 | White | 434/429 |
| 4,369,882 | * | 1/1983 | Schluger | 206/232 |
| 4,733,863 | * | 3/1988 | Novotny | 273/1 R |
| 4,840,275 | * | 6/1989 | Faiola et al. | 206/423 |
| 4,902,042 | * | 2/1990 | Rassi | 283/2 |
| 4,917,236 | * | 4/1990 | Galvez-Moran | 206/102 |
| 4,943,088 | * | 7/1990 | Wada | 281/39 |
| 4,946,414 | * | 8/1990 | Zimmer | 446/71 |
| 4,975,061 | * | 12/1990 | Avrill | 434/304 |
| 5,209,349 | * | 5/1993 | Porter et al. | 206/232 |
| 5,213,214 | * | 5/1993 | Stringham | 220/555 |
| 5,447,584 | * | 9/1995 | Shakespeare et al. | 156/63 |
| 5,449,179 | * | 9/1995 | Hefferan | 273/269 |
| 5,579,905 | * | 12/1996 | Ingber et al. | 206/232 |
| 5,762,339 | * | 6/1998 | Olson | 273/269 |
| 5,807,112 | * | 9/1998 | Zeck | 446/72 X |
| 5,980,354 | * | 11/1999 | Prest | 446/147 X |

OTHER PUBLICATIONS

Barbara Barbieri McGrath, "The M&M's Brand Counting Book," Charlesbridge Publishing (Watertown, MA), (Jul. 1994).

* cited by examiner

*Primary Examiner*—D. Neal Muir
(74) *Attorney, Agent, or Firm*—Oldham & Oldham Co., L.P.A.

(57) ABSTRACT

The present invention relates to a book for young readers designed to make reading more enjoyable. The book of the present invention preferably includes illustrations on at least some of the pages thereof. Additionally, edible candy is provided as a part of the book pages and may be positioned to form a part of an illustration found on a page. The candy is attached to or otherwise provided as a part of the book pages in a manner so that it may be easily removed from the book and eaten by the reader. In an alternative embodiment, the book pages may include holes formed therein and the candy may be provided on an insert designed to be placed behind the page so that the candy is in registry with the holes formed in the page and so that the candy extends out through the holes when the insert is placed immediately behind the page. In this manner, after the candy has been removed from book, the insert may be removed and replaced with another candy containing insert.

32 Claims, 2 Drawing Sheets

BOOK INCLUDING EDIBLE ARTICLES SUCH AS CANDY AS A PART OF THE PAGES

Matter enclosed in heavy brackets [ ] appears in the original patent but forms no part of this reissue specification; matter printed in italics indicates the additions made by reissue.

FIELD OF INVENTION

The present invention relates generally to books, and more particularly to a book for young readers designed to make reading more enjoyable. The book of the present invention preferably includes illustrations on at least some of the pages thereof. Additionally, edible candy is provided as a part of the book pages and may be positioned to form a part of an illustration found on a page. The candy is attached to or otherwise provided as a part of the book pages in a manner so that it may be easily removed from the book and eaten by the reader.

BACKGROUND OF THE INVENTION

Encouraging children to read has always been a concern of society. As school and work become increasingly competitive, the importance of encouraging children to read at a young age has increased.

Many different types of books have been designed to make reading more enjoyable for young readers. For example, there are books that allow the reader to see his or her image superimposed on the pages thereof. Other books are designed to play music or other sounds. However, parents and others are continuously looking for new ways to encourage young readers.

SUMMARY OF THE INVENTION

The present invention is therefore directed to a book designed to make reading more enjoyable for young readers comprising at least one page and at least one piece of edible candy releasably attached to the page. Preferably, the page includes an illustration thereon and the candy is attached to the page so that it forms a part of the illustration. In the manufacturing process, the candy may be placed on the pages of the book by hand or by the use of an automated machine. In a preferred embodiment, the pieces of candy are positioned on each illustrated page in one or more substantially straight columns and/or rows to facilitate the automated manufacturing of the book pages.

In an alternative embodiment, the pages of the book may include one or more holes formed therein, and the candy may be provided in the proper relative positions on a separate substrate to form a candy insert such that when the book page and the candy insert are positioned immediately adjacent to one another, the candy pieces are in registry with and extend out through the holes formed in the page. Preferably, the book page is illustrated and the holes formed therein are positioned so that when the candy insert and the book page are positioned immediately adjacent one another, the candy pieces are in registry with and extend out through the holes formed in the page such that the candy forms a part of the illustration.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
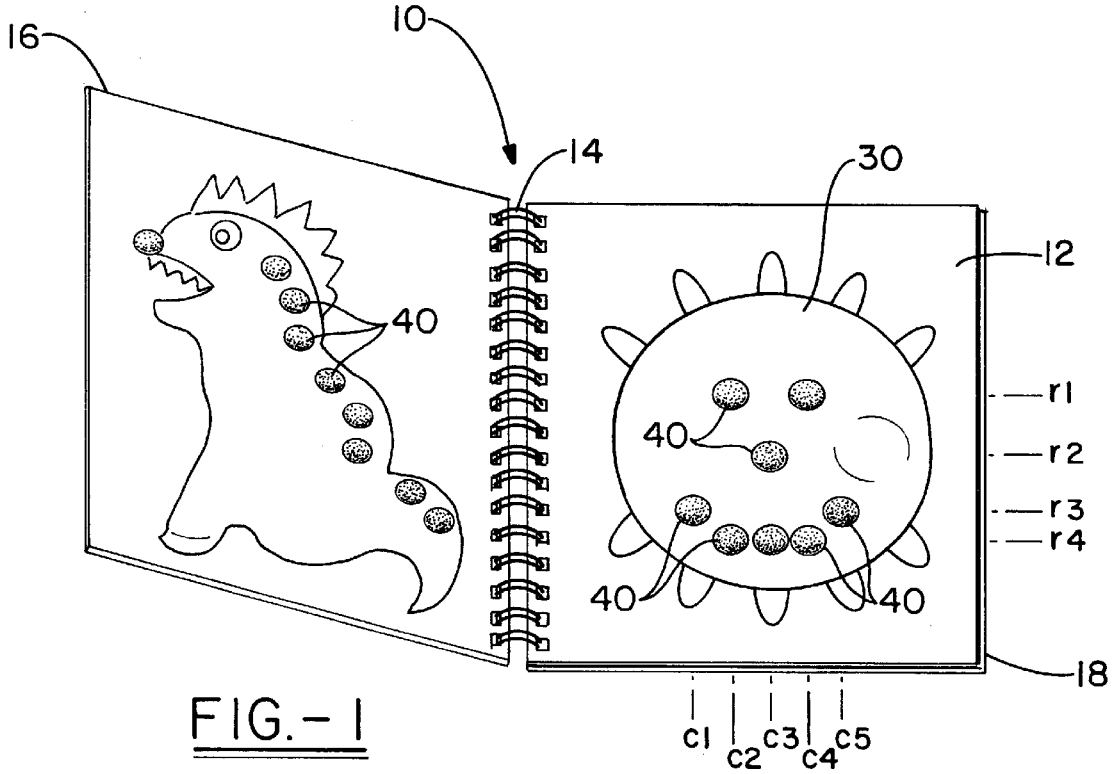
FIG. 1 pictorially illustrates a book in accordance with the present invention.
Figure 2A:
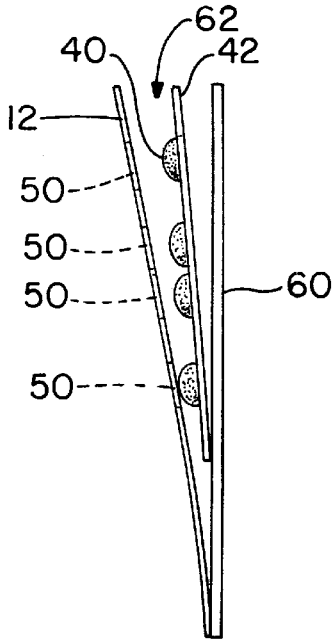
FIG. 2A is a side elevational view of the embodiment shown in FIG. 2.
Figure 2B:
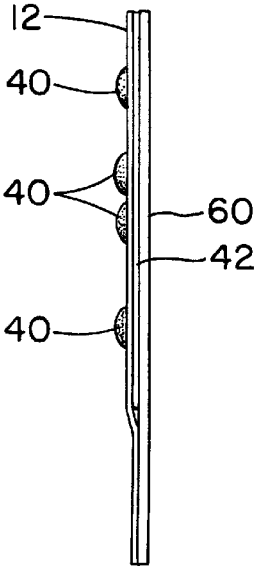
FIG. 2B is a side elevational view of the embodiment shown in FIG. 2 in its final assembled form.
Figure 2:
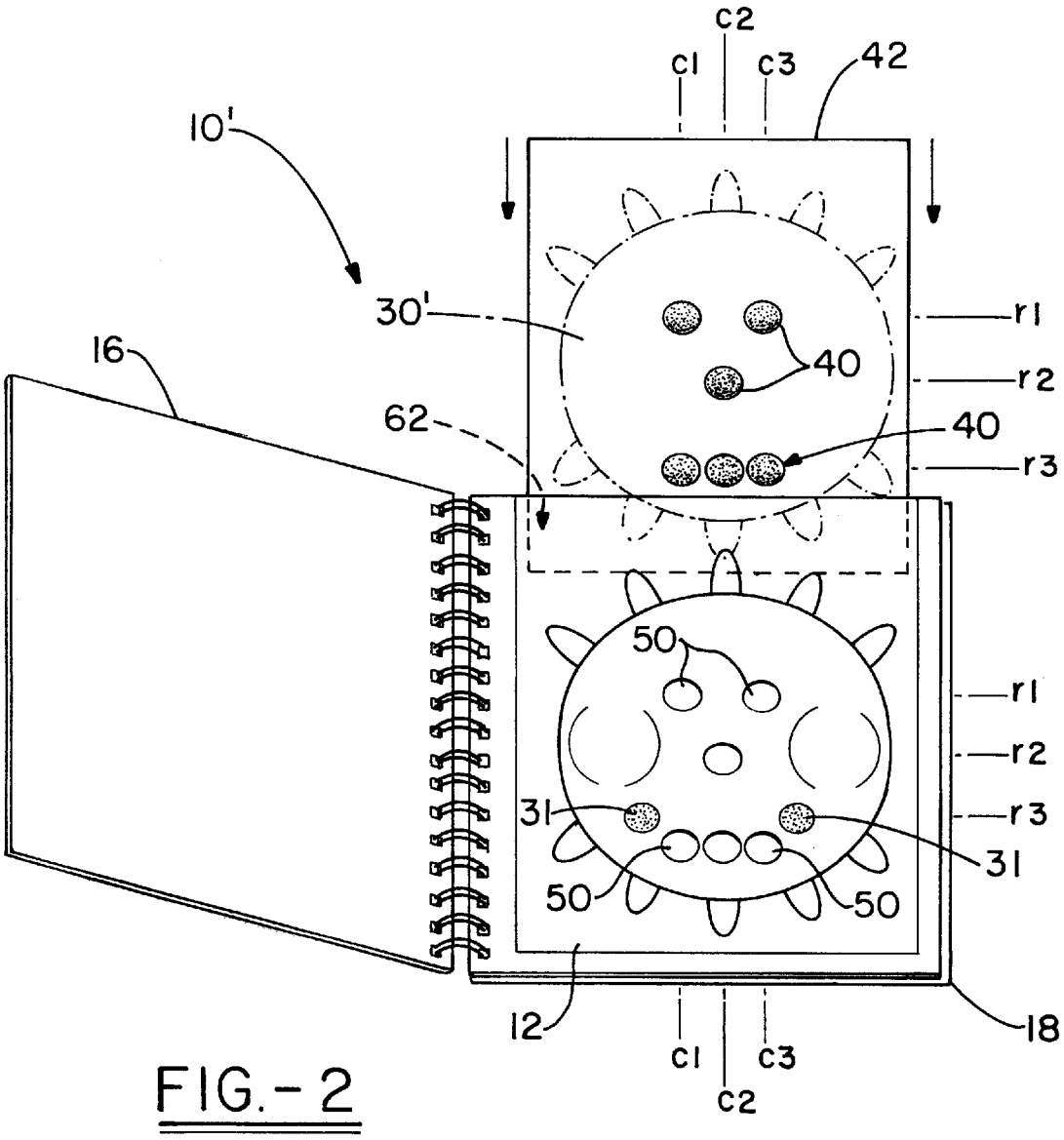
FIG. 2 pictorially illustrates an alternative embodiment of the present invention.

A book in accordance with the present invention is shown generally at 10 and 10' in FIGS. 1 and 2 respectively and comprises one or more pages 12 bound together in book form by a binding 14. Binding 14 may be formed in any suitable manner known in the book binding art. For example, a spiral wire binding or an adhesive may be used to bond the various pages 12 of book together. Book 10 is contemplated for use by children and as such, book 10 may be manufactured to withstand some amount of mistreatment. For example, pages 12 of book 10 may be formed from relatively heavy paper stock so that the pages 12 will resist tearing. Also, a front cover 16 and a rear cover 18 are preferably provided to protect the pages 12 of book 10.

Figure 1A:
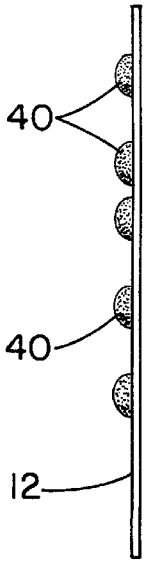
FIG. 1A is a side elevational view of a page including candy in accordance with the present invention.

A preferred embodiment of the book 10 of the present invention is shown in FIGS. 1 and 1A wherein at least one of the pages 12 of book 10, and preferably a plurality of pages 12 include an illustration 30 printed, painted, or otherwise disposed on at least a portion thereof. Any illustration may be utilized and the invention is not meant to be limited to the examples shown in the figures. One or more pieces of candy 40 are attached to the page 12 including an illustration 30 thereon such that the candy forms a part of the illustration 30. In an alternative embodiment, the candy 40 may be attached to a page 12 of book 10 for reasons other than to form a part of an illustration 30 found on the page 12. For example, a piece of candy 40 may be attached at the bottom of each page 12 so that upon reading the page 12 a child may remove and eat the candy 40 as a reward.

In a preferred embodiment, the candy 40 is "button" candy having a generally dome or droplet shape and may be of any size and color. However, any other suitable candy 40 may be used and the invention is not meant to be limited to the particular candy 40 described herein. The candy 40 is preferably attached to the pages 12 of book 10 by a nontoxic adhesive substance or by the action of the natural sticky properties of the candy 40 upon the page 12 such that the reader of the book may remove and eat the pieces of candy 40 from the pages 12 of book 10. The portion of the page 12 under each piece of candy 40 may be colored to correspond to the surrounding area of the page or may be white so that the reader can use a crayon or the like to color the area after the piece of candy 40 has been removed from the page 12. In the manufacturing of book 10, candy 40 may be attached to each page 12 by hand, or by the use of an automated machine. Many different types of depositing machines exist and are suitable for use in depositing candy 40 upon pages 12 or upon separate insert sheets 42 (FIG. 2) as is discussed in more detail below. For example, suitable depositing machines are manufactured by Knobel and may be purchased in the United States from American Chocolate Mould Co., Inc., 3194 Lawson Boulevard, Oceanside, N.Y. 11572. The present invention may also be provided in kit form wherein a supply of candy 40 is provided to be attached to the pages 12 of book 10 by the reader. It is thought in a further preferred embodiment, although not required, to design the illustrations 30 such that the candy pieces 40 may be deposited on the pages 12 in one or more substantially straight columns c1,c2,c3,c4,c5 and/or one or more substantially straight rows r1,r2,r3,r4. Such an arrangement is thought to facilitate the automated process of depositing the candy pieces 40 onto the pages 12. Not depositing candy pieces 40 on pages 12 in substantially straight columns c1–c5 and/or rows r1–r4 would necessitate more sophisticated equipment and additional manufacturing time, although such is contemplated by the present invention.

An alternative embodiment of the present invention is shown at 10' in FIG. 2 wherein at least one page 12 includes an illustration 30 printed, painted, or otherwise disposed thereon. One or more holes 50 are formed through the page 12 at predetermined locations relative to the illustration 30 2A and 2B, page 12 preferably includes a backing sheet 60 connected to page 12 in such a manner to form a pocket 62 between page 12 and backing sheet 60. Backing sheet 60 may be formed by an adjacent page 12 of book 10'. Candy pieces 40 are releasably adhered to a separate sheet of paper or another suitable substrate material in relative positions corresponding to the placement of holes 50 through page 12 to form a candy insert 42. Insert 42 is designed to be received within pocket 62 formed between page 12 and backing sheet 60 such that when page 12 and insert 42 are positioned immediately adjacent one another as is shown in FIG. 2B, candy pieces 40 are in registry with and extend outward through holes 50 formed through page 12 to form a part of the illustration 30. Illustration 30 may include printed regions 31 that are of a similar size, shape, and color as candy pieces 40 to complete the overall appearance of the illustration 30 when the book is assembled as is shown in FIG. 2B. The candy pieces 40 may then be removed from the book 10' and eaten by the reader. However, it can be seen that after candy pieces 40 are removed from the book 10', it is then a simple matter to replace insert 42 with another similar insert 42 containing additional candy 40 attached thereto. In this manner, it can be seen that the invention provides a book 10', including candy 40 that may be reused numerous times by a child or others. As was discussed with respect to FIGS. 1 and 1A, it is thought preferable to arrange holes 50, and consequently candy pieces 40 in substantially straight columns c1,c2,c3, and/or substantially straight rows r1,r2,r3 to facilitate the automated placement of candy pieces 40 onto insert 42 in the required configuration, although such is not required. Although it is preferred that the candy 40 form part of the illustration 30 of page 12, holes 50, and consequently candy 40 may be positioned on a non-illustrated page 12 and/or at any desired location upon a page 12.

Those skilled in the art will recognize that the alternative embodiment of the present invention discussed it relation to FIGS. 2 through 2B may also be provided in kit form, wherein the kit includes several inserts corresponding to various illustrated pages 12 of book 10'. The insert 42 may be marked to indicate an association with a particular page 12 of book 10' or, this association between certain inserts 42 and pages 12 may be made by the young reader upon examination and comparison of the holes 50 formed through any page 12 and the placement of the candy pieces 40 upon the various insert sheets 42. For example, in FIG. 2, it may be seen that insert 42 includes an illustration shown in phantom at 30' that corresponds to illustration 30 on page 12. The correspondence between illustrations 30,30' will assist a young reader in choosing the proper insert 42 for each page 12 of book 10.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A book *assembly* comprising:

*a plurality of similarly configured edible candy pieces;*

*a book comprising a front cover, a rear cover and a plurality of pages including at least one page having a pictorial illustration on at least a portion thereof which suggests that one or more artistic features of said pictorial illustration can be supplied apart from the book;*

[at least one piece of] *said plurality of similarly configured* edible candy *pieces* releasably attached to an outer surface of said at least one [illustrated] page, such that said [at least one piece of] *plurality of* edible candy [forms]*pieces are used to provide said suggested artistic features and form* a part of [an] *said pictorial* illustration on said at least one [illustrated] page.

[2. A book as recited in claim 1, wherein said at least one page includes an illustration thereon and said at least one piece of edible candy is releasably attached to said at least one illustrated page such that said at least one piece of edible candy forms a part of said illustration.]

3. A book *assembly* as recited in claim 1, wherein said [at least one piece of] edible candy [releasably attached to said at least one illustrated page is provided by a plurality of pieces of candy] *pieces are* provided in at least one substantially straight row.

4. A book *assembly* comprising:

*a book comprising a front cover, a rear cover, and a plurality of pages including* at least one page having *a pictorial illustration and* at least one hole formed therethrough; and at least one piece of edible candy releasably attached to a substrate in a predetermined position to form a candy insert such that said at least one piece of edible candy is in registry with and extends out of said at least one hole formed through said page when said at least one page and candy insert are positioned immediately adjacent to one another, wherein said substrate is selectively positioned adjacent to said page, *said at least one piece of edible candy forming a part of said illustration.*

5. A book *assembly* as recited in claim 4, wherein, said at least one page includes an illustration thereon and said at least one hole is formed through at least a portion of said illustration such that said at least one piece of candy is in registry with and extends out of said at least one hole to form a part of said illustration when said at least one illustrated page and said candy insert are positioned immediately adjacent one another.

6. A book *assembly* as recited in claim 4, wherein, said at least one hole formed through said at least one page *comprises a plurality of holes*, and said at least one piece of edible candy releasably attached to said substrate [are] *comprises a plurality of pieces, said holes and said pieces of candy* each *being* provided in at least one substantially straight column.

7. A book *assembly* as recited in claim 4, wherein, said at least one hole formed through said at least one page *comprises a plurality of holes*, and said at least one piece of edible candy releasably attached to said substrate [are] *comprises a plurality of pieces, said holes and said pieces of candy* each *being* provided in at least one substantially straight row.

8. A book *assembly* as recited in claim 5, wherein said candy insert includes an illustration thereon corresponding to said illustration on at least one of said pages of said book [at least one piece of edible candy releasably attached to an outer surface of said at least one illustrated page, such that at least one piece of edible candy forms a part of an illustration on said at least one illustrated page].

*9. A book assembly as recited in claim 1 wherein a plurality of pages have pictorial illustrations thereon which each suggest that one or more artistic features of said pictorial illustration can be supplied apart from the book, said plurality of similarly configured candy pieces are capable of releasable attachment to any such pictorial illustration.*

*10. A book assembly as recited in claim 1 wherein said plurality of edible candy pieces are removable from said page.*

*11. A book assembly as recited in claim 9 wherein said backing sheet is formed from an adjacent page of said book.*

*12. A book assembly comprising:*

*a plurality of similarly configured edible articles;*

*a book comprising a front cover, a rear cover and a plurality of pages including at least one page having a pictorial illustration on at least a portion thereof which suggests that one or more artistic features of said pictorial illustration can be supplied apart from the book; and*

*said plurality of similarly configured edible articles capable of being removably positioned on said pictorial illustration in a manner such that said edible articles are used to provide said artistic features which said illustrations suggested be supplied apart from the book, said edible articles thereby forming a part of said illustration.*

*13. A book assembly as recited in claim 12, wherein at least one said edible article is supplied by a plurality of candy to be positioned on said at least one page by a person within a group consisting of a reader of said book, a parent of the reader of said book and any other person entrusted with assisting and supervising the reader of said book.*

*14. A book assembly as recited in claim 12, wherein a plurality of similarly configured edible articles is provided with said book.*

*15. A book assembly as recited in claim 12, wherein said at least one edible article is releasably attached to said at least one page.*

*16. A book assembly as recited in claim 15, wherein said at least one edible article is releasably attached using an adhesive.*

*17. A book assembly as recited in claim 12, wherein a plurality of pages have pictorial illustrations thereon which each suggest that one or more artistic features of said pictorial illustration can be supplied apart from the book, said plurality of similarly configured edible articles are capable of being removably positioned to any such pictorial illustration.*

*18. A book assembly as recited in claim 12 wherein said edible articles are pieces of candy.*

*19. A book assembly as recited in claim 12 wherein said plurality of edible articles are removable from said page.*

*20. A book assembly comprising:*

*a front cover, a rear cover and a plurality of pages, including a plurality of said pages having an illustration thereon;*

*a supply of similarly configured edible articles;*

*a plurality of said illustrated pages having at least one hole formed therethrough; and*

*at least one of said similarly configured edible articles capable of being placed in registry with and extending out of said at least one hole formed through said page to form a part of said illustration on said page, with like edible articles capable of use to form parts of illustrations on one or more additional pages, said edible articles being removable from said pages.*

*21. A book assembly as recited in claim 20, wherein said at least one page includes an illustration thereon and said at least one hole is formed through at least a portion of said illustration such that said at least one edible article is in registry with and extends out of said at least one hole to form a part of said illustration.*

*22. A book assembly as recited in claim 20, wherein said at least one edible article placed in registry with and extending out of said at least one hole formed through said page is supplied by said plurality of edible articles included with said book and to be placed in registry with and extending out of said at least one hole by a reader of said book.*

*23. A book assembly as recited in claim 20 wherein said edible articles are pieces of candy.*

*24. A book assembly as recited in claim 20 wherein said illustrated pages having at least one hole formed therethrough further includes a backing sheet connected to said page.*

*25. A book assembly as recited in claim 20 wherein said at least one hole is formed in a predetermined location on said at least one page.*

*26. A book comprising:*

*a front cover, a rear cover and a plurality of pages including*

*at least one page having a plurality of holes formed therethrough; and*

*a plurality of pieces of edible candy releasably attached to a substrate in a predetermined position to form a candy insert such that at least one piece of edible candy of said plurality of pieces of edible candy is in registry with and extends out of a hole of said plurality of holes formed through said page when said at least one page and said candy insert are positioned immediately adjacent to one another, wherein said substrate is selectively positioned adjacent to said page said at least one piece of edible candy forming a part of said illustration.*

*27. A book as recited in claim 26, wherein each hole of said plurality of holes and each piece of edible candy of said plurality of pieces of edible candy releasably attached to said substrate are provided in at least one substantially straight column.*

*28. A book as recited in claim 26, wherein each hole of said plurality of holes and each piece of edible candy of said plurality of pieces of edible candy releasably attached to said substrate are provided in at least one substantially straight row.*

*29. A method of encouraging the reading of a book comprising:*

*obtaining a book having at least one illustrated page, said at least one illustrated page having one or more predetermined locations for the placement of edible articles;*

*obtaining a supply of edible articles;*

*placing at least one edible article at a predetermined location on said illustrated page such that said edible*

*article is removably positioned on said at least one page to form a part of said illustration; and*

*removing said at least one edible article in conjunction with reading or viewing said illustrated page.*

*30. A method as recited in claim 29 wherein said edible article is a candy.*

*31. A method as recited in claim 29 wherein said positioned edible article is releasably attached to said at least one page.*

*32. A method as recited in claim 29 wherein at least one of said one or more predetermined locations is a hole formed in said page such that said at least one edible article is in registry with and extends out of said at least one hole to form part of said illustration.*

*33. A book assembly comprising:*

*a plurality of similarly configured edible articles;*

*a book comprising a front cover, a rear cover and a plurality of pages including at least one page having a pictorial illustration thereon which suggests that one or more artistic features of said pictorial illustration can be supplied apart from the book; said plurality of similarly configured edible articles releasably attached to an outer surface of said at least one illustrated page, such that said edible articles are used to provide said suggested artistic features and form a part of said pictorial illustration on said at least one page.*

* * * * *